United States Patent
Furr et al.

(10) Patent No.: US 9,672,503 B2
(45) Date of Patent: Jun. 6, 2017

(54) BANDWIDTH METERING IN LARGE-SCALE NETWORKS

(71) Applicant: Amazon Technologies, Inc., Reno, NV (US)

(72) Inventors: Michael Brooke Furr, Washington, DC (US); Christopher Ian Hendrie, Centreville, VA (US); Kevin Christopher Miller, Herndon, VA (US); Ryan David Murphy, Ashburn, WA (US); Sandeep Shantharaj, Herndon, VA (US)

(73) Assignee: Amazon Technologies, Inc., Reno, NV (US)

( * ) Notice: Subject to any disclaimer, the term of this patent is extended or adjusted under 35 U.S.C. 154(b) by 174 days.

(21) Appl. No.: 13/898,570

(22) Filed: May 21, 2013

(65) Prior Publication Data

US 2014/0351106 A1 Nov. 27, 2014

(51) Int. Cl.
*G06Q 20/14* (2012.01)
*H04L 12/26* (2006.01)
(Continued)

(52) U.S. Cl.
CPC ......... *G06Q 20/145* (2013.01); *H04L 12/14* (2013.01); *H04L 12/1403* (2013.01); *H04L 12/1407* (2013.01); *H04L 43/04* (2013.01); *H04M 15/31* (2013.01); *H04M 15/41* (2013.01); *H04M 15/43* (2013.01); *H04M 15/61* (2013.01); *H04M 15/66* (2013.01); *H04M 15/825* (2013.01); *H04M 15/8214* (2013.01); *G06Q 20/14* (2013.01); *G06Q 30/04* (2013.01);
(Continued)

(58) Field of Classification Search
CPC ...... G06Q 30/04; G06Q 20/14; G06Q 20/145; H04L 63/0272; H04L 67/22; H04L 43/0876; H04L 12/1403
USPC ..................................................... 705/30, 34
See application file for complete search history.

(56) References Cited

U.S. PATENT DOCUMENTS 6,651,099 B1 11/2003 Dietz et al.
7,113,477 B1 9/2006 O'toole
(Continued)

OTHER PUBLICATIONS

International Search Report and Written opinion from PCT/US14/39023, filed Oct. 10, 2014, Amazon Technologies, Inc., pp. 1-15.
(Continued)

*Primary Examiner* — Ryan Zeender
*Assistant Examiner* — Milena Racic
(74) *Attorney, Agent, or Firm* — Robert C. Kowert; Meyertons, Hood, Kivlin, Kowert & Goetzel, P.C.

(57) ABSTRACT

Methods and apparatus for bandwidth metering in large-scale networks are disclosed. Metadata for a network transmission involving a virtualized resource at a host of a provider network, including endpoint address information and a traffic metric, is determined at a metering component. The metadata is aggregated at another metering component and provided to a traffic classification node. The traffic classification node generates a categorized usage record for the network transmission, based at least in part on network topology information associated with the provider network. The categorized usage record is used to determine a billing amount for the network transmission.

16 Claims, 8 Drawing Sheets

(51) Int. Cl.
*H04L 12/14* (2006.01)
*H04M 15/00* (2006.01)
*G06Q 30/04* (2012.01)
*H04L 12/24* (2006.01)
*H04L 29/12* (2006.01)

(52) U.S. Cl.
CPC .......... *H04L 12/1435* (2013.01); *H04L 41/12* (2013.01); *H04L 61/2514* (2013.01)

(56) References Cited

U.S. PATENT DOCUMENTS

| | | | |
|---|---|---|---|
| 7,366,174 B2 | 4/2008 | Macfaden et al. | |
| 7,664,028 B1* | 2/2010 | Gingras | H04L 41/5022 370/229 |
| 8,209,415 B2 | 6/2012 | Wei | |
| 8,886,176 B2* | 11/2014 | Luna | H04W 12/06 455/422.1 |
| 8,954,760 B2* | 2/2015 | Kundu | G06F 17/30129 713/193 |
| 9,178,785 B1* | 11/2015 | Massoudi | H04L 43/0817 |
| 9,325,662 B2* | 4/2016 | Luna | H04L 61/1511 |
| 9,326,189 B2* | 4/2016 | Luna | H04W 28/06 |
| 9,336,061 B2* | 5/2016 | Beaty | G06F 9/5072 |
| 2003/0046396 A1* | 3/2003 | Richter | G06F 9/505 709/226 |
| 2003/0123442 A1 | 7/2003 | Drucker et al. | |
| 2004/0010473 A1* | 1/2004 | Hsu et al. | 705/77 |
| 2008/0059346 A1 | 3/2008 | Schweitzer et al. | |
| 2009/0086663 A1 | 4/2009 | Ho et al. | |
| 2010/0205369 A1 | 8/2010 | Chang et al. | |
| 2010/0223364 A1 | 9/2010 | Wei | |
| 2011/0055378 A1* | 3/2011 | Ferris | G06F 11/3419 709/224 |
| 2011/0201304 A1* | 8/2011 | Sutaria | H04L 12/14 455/408 |
| 2012/0092995 A1 | 4/2012 | Arvidsson et al. | |
| 2012/0116937 A1* | 5/2012 | Van Biljon et al. | 705/34 |
| 2012/0297061 A1 | 11/2012 | Pedigo et al. | |
| 2013/0041934 A1 | 2/2013 | Annamalaisami et al. | |
| 2013/0046809 A1 | 2/2013 | Jiang et al. | |
| 2013/0060933 A1 | 3/2013 | Tung et al. | |
| 2013/0103827 A1 | 4/2013 | Dunlap et al. | |
| 2013/0148498 A1* | 6/2013 | Kean | H04L 41/0893 370/230 |

OTHER PUBLICATIONS

Extended International Search Report from PCT/US14/39023, dated Jan. 25, 2017, Amazon Technologies, Inc., pp. 1-13.

Jason Meiers, "Cloud Metering and Billing," IBM Corporation, Aug. 8, 2011, developerWorks, pp. 1-8.

* cited by examiner

BANDWIDTH METERING IN LARGE-SCALE NETWORKS

BACKGROUND

More and more computing applications are being migrated to the cloud environment. Some large-scale provider networks support dozens of multi-tenant cloud-based services serving thousands of clients distributed around the world. These types of services often rely upon the use of virtualization technologies, such as virtualized compute servers, virtual storage devices, and virtual networks of various kinds. Depending on the type of virtualization techniques being used, a single underlying resource (such as a host or server) may often support multiple logical or virtualized resource instances potentially serving the needs of multiple clients concurrently.

Clients are typically billed for their use of such services in two ways: flat fees based, for example, on enabling a service to begin with, or on reserving some set of resources, and usage-based fees. Determining the up-front or flat fee that a given client is to be billed for obtaining access to a particular service, or for reserving a resource instance, is usually straightforward. Determining the usage-based fees for a given service, on the other hand, may require a non-trivial amount of metering and tracking. For example, a particular service may involve the use of compute cycles (e.g., CPU usage at various virtualized compute servers), storage space (e.g., some amount of persistent storage at various storage servers), as well as network bandwidth (e.g., associated with data transfers performed directly or indirectly at client request and/or commands issued on behalf of the client). The usage of each of these types of resources impacts the expenses incurred by the provider network operator implementing the services, leading to the requirement for usage-based fees. Accounting for clients' resource consumption accurately and fairly may itself consume resources of the provider network, however, and as a result, tradeoffs between the overhead associated with metering and billing and the granularity at which resource usage details are captured may have to be considered for various resource types.

Achieving accurate and yet efficient metering may be even more of a problem for network bandwidth usage than for other types of resources. For some types of services, it may be relatively easy to identify the "ownership" (i.e., billing responsibility) for a certain data transfer over the network, for example because a given object transfer may be initiated as a result of an invocation of a particular type of application programming interface (API) defined for the service, which can be traced to the client that invoked the API. However, for other types of services, such as a service that implements virtual compute servers, it may not be so easy to track data transfers—e.g., after a particular virtual compute server is instantiated, the client may run various network-utilizing applications on the server, into which the provider network operator has little or no direct visibility. The complexity of assigning ownership for network traffic for a given service may increase further due to various factors: e.g., because multiple clients' traffic (potentially associated with any of several services) may be directed to or from a single physical server, because any given unit of network traffic may potentially be associated with multiple services (e.g., one service at the sending end and a different service at the receiving end), and/or because the network topology may change over time.

Figure 1:
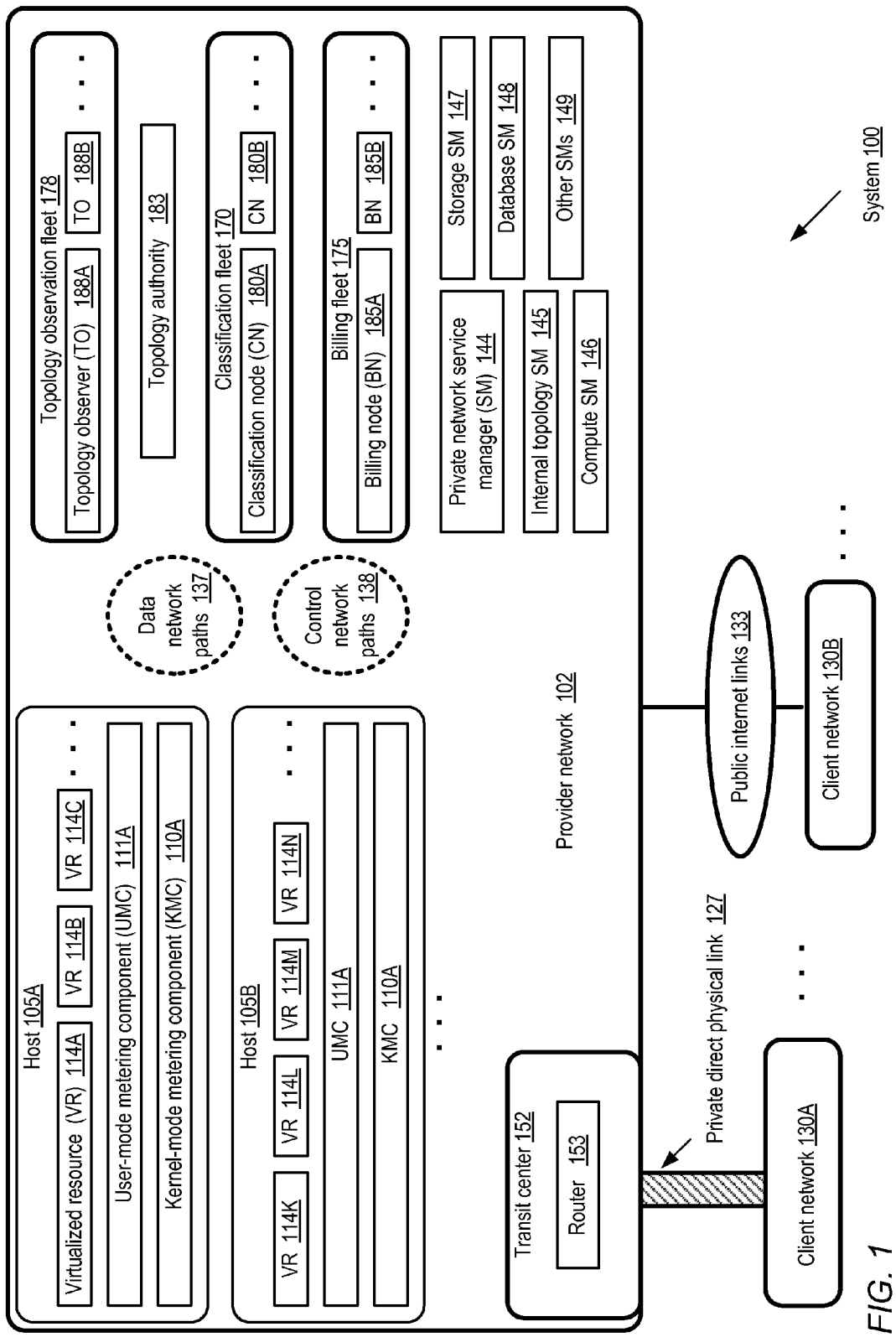
FIG. 1 illustrates an example system environment, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Various embodiments of methods and apparatus for bandwidth metering for large-scale networks, such as provider networks implementing a plurality of services, are described. Networks set up by an entity such as a company or a public sector organization to provide one or more multi-tenant services (such as various types of cloud-based computing or storage services) accessible via the Internet and/or other networks to a distributed set of clients may be termed provider networks in this document. The term "multi-tenant" may be used herein to refer to a service that is designed to implement application and/or data virtualization in such a manner that different client entities are provided respective customizable, isolated views of the service, such that one client to whom portions of the service functionality are being provided using a given set of underlying resources may not be aware that the set of resources is also being used for other clients. Generally speaking, a provider network may include numerous data centers hosting various resource pools, such as collections of physical and/or virtualized computer servers, storage devices, networking equipment and the like, needed to implement, configure and distribute the infrastructure and services offered by the provider. Some provider networks may support both single-tenant and multi-tenant services. For at least some of the services implemented in a provider network, clients may be billed based at least in part on the network bandwidth usage associated with their use of the service. Accordingly, the provider network operator may establish a distributed traffic metering system to efficiently collect network metadata (including, for example, the amount of data transferred and the Internet Protocol (IP) addresses of endpoints involved in a given data transfer), and utilize the collected metadata together with up-to-date network topology information to enable the accurate attribution of network traffic to different clients. Details regarding the various constituent components of such a distributed metering system are provided below for various embodiments. A number of different types of computing devices may be used singly or in combination to implement the distributed metering system and other resources of the provider network in different embodiments, including general purpose or special purpose computer servers, storage devices, network devices and the like.

A subset of the resources of the provider network may in some embodiments be offered for use by clients in units called "instances," such as virtual or physical compute instances, storage instances, or network resource instances. A virtual compute instance may, for example, comprise one or more virtual servers with a specified computational capacity (which may be specified by indicating the type and number of CPUs, the main memory size, storage device number and size, and so on) and a specified software stack (e.g., a particular version of an operating system, which may in turn run on top of a hypervisor). Resource instances of various kinds, including virtual compute instances, storage resource instances or network resource instances, may be instantiated on systems termed "virtualization hosts" (or more simply, "hosts") herein. In some embodiments, an instance host platform capable of instantiating N different virtual compute instances of a particular type may, for example, comprise a hardware server with a selected set of relatively low-level software components initially installed, such as virtualization manager software and/or operating system software typically utilizing a small fraction of the hardware server's compute capabilities. In some implementations, one or more instances of an operating system may be established for management purposes on a host and may not be assigned for use by client applications—that is, the virtualization management software on the host may include an operating system instance, which may be referred to herein as a "management operating system" or a "management software stack". As more virtual compute instances are launched, a larger portion of the server's compute capabilities may get used, e.g., for client applications running on the different virtual compute instances with their own operating system instances. As described below in further detail, one or more components of a management software stack running on a host may be used for network traffic metering purposes in some embodiments. For example, according to one embodiment, a lightweight kernel-mode on-host metering component may be configured to collect low-level networking metadata associated with network transfers, such as the endpoint (source or destination) Internet Protocol (IP) address for a given set of one or more packets and the transfer size (e.g., number of bytes transferred). The acronym "KMC" may be used herein to represent such a kernel-mode metering component. Another on-host metering component, e.g., a user-mode component (UMC) of the management operating system, may receive and aggregate the metadata obtained by the kernel-mode component in such an embodiment. For example, in one implementation the UMC may be configured to combine all the metadata collected over some time period for any given endpoint IP address into one record. In some embodiments, as described below, the UMC (or the KMC) may combine metadata for a set of IP addresses (e.g., a range of IP addresses A.B.C.*, where the * represents a wildcard), e.g., if the number of distinct IP addresses for which metadata is collected in a given time interval exceeds some threshold.

According to one embodiment, one or more computing devices of the provider network may be collectively designated as nodes of a traffic classification fleet. These traffic classification nodes (which may be referred to herein simply as classification nodes or CNs) may be configured to receive aggregated metadata records transmitted from the hosts (e.g., by UMCs). The CNs may also be configured to obtain or generate time-indexed representations of the network topology of at least some portions of the provider network, comprising such information as the set of IP addresses associated with a given client and/or with a given service at a given point in time. Using the time-indexed network topology, a given CN may map at least a portion of the networking metadata collected at a given set of hosts, to one or more billable usage categories that can be used to generate billing amounts for network transfers. In some embodiments, the CN may use such a mapping technique to generate categorized usage records corresponding to the traffic metadata collected at the hosts. The categorized usage records may then be used (in some cases after further aggregation steps), e.g., at billing nodes of the provider network, to generate the billing amounts to be provided to clients for the network traffic that was generated on behalf of the clients at the hosts. In one embodiment, each categorized usage record may include at least (a) an indication of a billable usage category and (b) a measure of the detected amount of traffic associated with that billable usage category during some time interval. It is noted that the term "usage category" may be used as a substitute for the term "billable usage category" in the following description.

Consider the following example of the kinds of operations that may be performed by a CN in one embodiment. The CN may receive networking metadata (including destination endpoint IP addresses) regarding 1000 megabytes of data transferred from a given virtualization host during a time period T1. The CN may use time-indexed network topology information to determine to which client or clients the IP addresses should be assigned for billing purposes, and/or with which specific service or services the data transfers should be associated. As an example, the CN may generate categorized usage records similar to the following for the 1000 megabytes: ((500 megabytes, client C1, service S1, usage category U1), (250 megabytes, client C2, service S2, usage category U2), (200 megabytes, client C3, service S3, usage category U3), (50 megabytes, client C1, service S4, usage category U4)). The usage categories in this example may indicate billing differences based on factors such as whether the traffic flowed entirely within the provider network or whether at least some of the traffic flowed outside the provider network, whether the client had established a discounted rate for certain types of traffic to certain IP addresses, and the like.

Thus, in at least one embodiment some usage categories may be defined based on whether all the corresponding traffic was completely intra-provider-network (i.e., only internal paths within the provider network were used) or at least partially extra-provider-network (i.e., at least some network paths external to the provider network were used); other usage categories may be defined based on the services involved (e.g., whether a private network service was used), or based on special cases such as whether a private direct physical link established on behalf of a client was used for the data transfer, as described below with reference to FIG. 1. In at least some embodiments, intra-provider network traffic may be further classified for billing purposes into subcategories such as local-provider-network traffic and inter-region-provider-network traffic, where traffic between endpoints that are located within a given set of one or more data centers in a given geographical region is classified as local-provider-network traffic, while traffic that crosses geographical region boundaries defined by the provider network operator is classified as inter-region-provider-network traffic. Similar categorized usage records may be generated for traffic from a plurality of hosts of the provider network. In some embodiments, a fleet of topology observer nodes may be set up in the provider network to monitor network configuration changes (e.g., due to dynamic routing changes that may affect part of the provider network's traffic flow as described below in scenarios in which private links are established with client networks). In at least one such embodiment, network configuration change monitiored by the topology observer nodes may be consolidated by a topology authority. A topology authority may, for example, comprise one or more hardware and/or software components of the provider network responsible for combining network configuration information to produce authoritative representations or records of network topology, as of different points in time, for various parts of the provider network (and/or some set of external networks linked to the provider network). Consolidated, time-indexed network topology information may be stored in a database or repository by the topology authority in some embodiments, and the CNs may utilize the consolidated topology information to generate the categorized usage records.

By distributing the work of assigning client ownership of measured network traffic across a plurality of components, such as the KMCs, UMCs, and CNs as described above, a highly scalable mechanism may be implemented in at least some embodiments, capable of handling tens of thousands of concurrent client devices at respective IP addresses utilizing services from tens of thousands of virtualization hosts. The overhead on the virtualization hosts themselves may be minimized by performing only a small set of operations at the kernel layer, thus reducing interference to the low-level networking stack operations involved in transmitting or receiving the data. The use of a dedicated fleet of CNs for the generation of the categorized usage records may ensure that as the number of clients, endpoints, and services increases, the metering load does not increase proportionately at the virtualization hosts, i.e., that the impact of the metering on the clients' applications is kept as low as possible.

According to some embodiments, the components of the distributed metering system may need to take into account various factors that may complicate the basic metering mechanism introduced above. For example, in some embodiments, various types of private networks or special-purpose networks may be supported by a provider network. Some clients may set up private networks within the provider network (which may be termed "virtual private clouds" or VPCs in some scenarios), in which the clients have substantial flexibility in assigning network addresses to devices of the private networks. As a result, a particular IP address IP1 assigned as part of a private network may actually be the same IP address that is assigned to some other device elsewhere in the provider network or outside the provider network. The network metadata collected for traffic associated with the private network may take such potentially misleading endpoint address information into account, e.g., by the KMC communicating with the portion of the networking stack that is aware of the private network configuration. In addition, in some embodiments, the provider network may enable a client to establish a private, direct physical link (which may be referred to in some scenarios as a "direct connect" link) at a transit center between the provider network and a client's own network, and as a result routing information associated with the client network may also have to be taken into account by the metering infrastructure of the provider network. In one embodiment, the provider network may allow the establishment of VPNs (virtual private networks) between portions of the provider network (such as a particular client's private network) and client networks, and the network topology associated with such VPNs may also have to considered for metering and billing purposes.

In various embodiments, a substantial volume of metering-related metadata may potentially be generated, e.g., if a given client application on a virtualization host established communications with a large number of distinct endpoints in a relatively short period of time. In order to avoid overwhelming the resources available for the metering system (e.g., the memory or compute resources used for the KMCs or UMCs, as well as the networking resources used to transmit the collected metadata to the CNs), in at least some embodiments various additional aggregating and/or sampling techniques may be dynamically introduced as needed. For example, in one implementation, if the number of endpoint IP addresses associated with traffic from a given host exceeds a threshold N during a time period T seconds, instead of continuing to monitor endpoint IP addresses for all packets, the endpoint addresses of only a random sample of the packets detected during the next T seconds may be collected. Similarly, various optimization techniques may be used at the UMCs as well in some embodiments, to ensure that the overhead associated with traffic metering remains low. Details regarding the various features of metering systems that may be implemented in various embodiments, including the functions described earlier as well as various kinds of optimizations and special cases, are provided below.

Bandwidth Metering System Environment

FIG. 1 illustrates an example system environment, according to at least some embodiments. As shown, system 100 includes a provider network 102, configured to implement a plurality of network-accessible multi-tenant (and/or single-tenant) services. Each service may be managed by a respective service manager (SM), which may itself comprise one or more hardware and/or software components or resources. A compute SM 146 may be configured to implement and manage a multi-tenant virtual compute instance service, for example. Similarly, a storage SM 147 may administer a multi-tenant storage service, a database service may be managed by a database SM 148, and various other SMs 149 may be configured for respective services implemented using resources of the provider network 102. In at least some embodiments, some services (such as an internal topology management service described below) may be used primarily for internal, administrative purposes, while other services may implement features accessible directly by clients. In the depicted embodiment, one or more of the services may be provided in the form of virtualized resources (VRs) 114, such as virtualized resources 114A, 114B and 114C on host 105A and virtualized resources 114K, 114L, 114M and 114N on host 105B. Virtualized resources 114 may include, for example, instances of virtual compute servers (managed by compute SM 146) or virtualized storage devices (managed by storage SM 147) in various embodiments. For example, a virtualized resource 114 corresponding to a compute service may comprise a virtual compute server instantiated at the host 105 at a client's request. The provider network 102 may comprise large numbers (e.g., many thousands) of hosts 105 distributed across numerous data centers in different geographical regions in some embodiments; for ease of presentation, however, only two example hosts 105 are shown in FIG. 1. Several different virtualized resources, at least some of which may be owned by or assigned to different clients than others, may be instantiated on a single host 105 in some embodiments. In at least some embodiments, the provider network may include two types of logical and/or physical network paths—data network paths 137 used primarily for transfers of client-generated data associated with the various services, and control network paths 138 used primarily for administrative and/or management operations (e.g., to support metering operations of the kinds described below).

Generally speaking, clients (e.g., application executed on behalf of customers of the provider network) may access the virtualized resources 114 of a given host 105 from various different types of network locations in different embodiments, such as at least the following categories of network locations. Some clients may access the virtualized resources 114 from a client network similar to 130B, which is linked to the provider network via links 133 of the public Internet in the depicted embodiment. In some embodiments, the provider network operator may enable the establishment of private, direct physical links (such as link 127) to a client network such as 130A; typically, such direct private links may be established at a transit center 152 or another edge location, e.g., at premises where some but not all of the networking equipment and infrastructure is owned, controlled or managed by the provider network operator. The establishment of such direct physical links to client networks such as 130A may enable clients to obtain higher bandwidth, often at a cheaper price than would be possible if third-party network service providers were used to link the client's external network 130A to the provider network 102. In some embodiments, clients that utilize such private direct physical links may be given discounts on network bandwidth usage by the provider network operator, e.g., relative to clients that rely on third-party providers or on the public Internet. In one embodiment, at least some client applications may access the virtualized resources 114 at one host 105 from a different host 105—e.g., some of the client's network traffic may pass only through internal data network paths 137, and may not leave the provider network. In one embodiment, the provider network 102 may support one or more private network services managed by a private network SM 144. A private network may comprise a plurality of hosts 105 as well as other types of compute, storage and/or networking resources, over which the client is provided substantial administrative control with respect to network addressing and configuration—for example, in some implementations a client that owns a private network may assign arbitrary public and/or private IP addresses to various devices within the private network, without being required to avoid possible duplication or overlaps in addresses with devices outside the private network. In some cases, a private gateway (not shown explicitly in FIG. 1) may be set up between a particular client's private network and the client's external network 130, enabling devices using private addresses within the private network to communicate with client devices in the client network 130 via a VPN (virtual private network).

In at least some embodiments, the rates at which clients are ultimately billed for network traffic may be based at least in part on the category of network addresses involved in the traffic transmission. Thus, in one example scenario, if a client transmits X megabytes between two addresses that are both inside the provider network, the billing amount for that traffic may be $ X*r1 (i.e., the billing rate may be $ r1 per megabyte of internal traffic), whereas if a client transmits X megabytes to a client network 130B via a direct private physical link, the billing amount may be $ X*r2, and if a client transmits X megabytes over a public Internet link to client network 130A, the billing amount may be $ X*r3. In the embodiment depicted in FIG. 1, the classification nodes (CNs) 180 (e.g., CNs 180A and 180B) of the classification fleet 170 may be responsible for determining, for a given amount of traffic about which they are provided networking metadata from the hosts 105, the category of network addresses to be used for billing purposes, and generating usage records accordingly, as described below in further detail. Usage categories may be defined on the basis of additional factors (e.g., in addition to just the IP addresses) as well in some embodiments, such as the types of services involved in the network traffic, whether any special-purpose network links such as the private direct links described above were used, or whether any client-specific discounts such as volume discounts are being implemented.

As shown in FIG. 1, each host 105 may comprise a respective pair of metering components: a kernel-mode metering component (KMC) 110 (e.g., KMC 110A at host 105A and KMC 105B at host 105B), and a user-mode metering component (UMC) 111 (e.g., UMC 111A at host 105A and UMC 111B at host 105B). In one implementation, the KMC and the UMC may both be implemented within a management operating system instance on the host (i.e., an operating system instance that is not assigned for client use). A KMC 110 at a given host 105 may be responsible for capturing low-level networking metadata (e.g., the IP addresses of the source or destination endpoints, and the data transfer sizes) for network packets directed to or from various VRs at the host 105 in one embodiment, and transmitting the captured low-level metadata to the corresponding UMC 111 on that same host for aggregation and transmittal to a CN 180. The UMC 111 may collect the metadata generated by the KMC 110 over some configurable period of time in the depicted embodiment, perform one or more computations on the collected metadata (e.g., aggregating the metadata on the basis of endpoint addresses), compress the aggregated metadata and transmit it to a selected CN 180 of the classification fleet 170. In at least some embodiments, the KMCs and/or the UMCs may be responsible for attaching timing information (e.g., a timestamp indicating when some set of network transmissions began or were completed) to the metadata provided to the CNs, which can then be used by the CNs to generate the categorized usage records based on the network topology as of the time of the transmissions. In some embodiments, some KMCs 110 may be configurable to provide metadata to UMCs 111 at other hosts, i.e., the KMC and the UMC involved in generating metering information may not have to be resident on the same host in such embodiments. A given UMC may gather metadata from multiple KMCs in some embodiments, and a given KMC may provide metadata to multiple UMCs in other embodiments.

In the embodiment shown in FIG. 1, the CNs 180 may utilize network topology information collected from a number of sources to map the aggregated metadata received from the UMCs 111 into categorized usage records for billing purposes. Some number of topology observer (TO) nodes 188, such as TO nodes 188A and 188B, may be established in some embodiments as part of a topology observation fleet 178 responsible for detecting changes to network configurations. In one embodiment, the TO nodes may represent passive or "phantom" router-like devices configured to listen for route advertisements made using the Border Gateway Protocol (BGP) or other similar protocols by other active routers 144 (such as routers 144A and 144B), including routers associated with client networks such as 130A to which traffic from the provider network has to be routed over private direct physical links 127. TO nodes 188 may also gather network configuration information (such as network masks in use along various routes) from other networking devices such as gateways, switches and the like in some embodiments. In one embodiment, TO nodes 188 may interact with various SMs (e.g., compute SM 146, storage SM 147 or database SM 148) to determine which IP addresses are being used by each of the services, and the TO nodes may record such service address mapsas well. In the depicted embodiment, a topology authority 183 may be configured to collect the configuration information from some or all of the TO nodes 188, and generate time-indexed topology representations that may be used by the CNs for generating categorized usage records. In other embodiments, the CNs may obtain service network addresses directly from the service managers. According to at least one embodiment, an internal topology SM 145 may be responsible for maintaining an up-to-date representation of the topology of the provider network's internal network, and the topology authority 183 may obtain topology updates from the internal topology SM 145 as well as the TO fleet 178 in such embodiments. In one embodiment, timestamps or other timing information associated with network configuration changes may be included in the topology representations produced by the topology authority and provided to the CNs 180. The categorized usage records produced by the CNs 180 may be transmitted to billing nodes 185 (e.g., billing node 185A or 185B) of a billing fleet 175, where billing amounts for the clients may be generated in the depicted embodiment.

In some embodiments in which private networks are implemented, which may result in apparent ambiguity regarding which IP addresses are assigned to which devices (e.g., because clients may select IP addresses of their choice within a private network), the ambiguity may be resolved at one of the metering components based on information about the private network's configuration—e.g., either at the KMCs 110 (in which case the information about the private addresses may be obtained from networking virtualization software components), the UMCs 111 or the CNs 180. It is noted that not all the components of system 100 illustrated in FIG. 1 may be present in some embodiments—e.g., some embodiments may not support private direct physical links 127, other embodiments may not include TO nodes 188, while in yet other embodiments private network SM 144 and/or internal topology SM 145 and their corresponding services may not be implemented.

Host-Based Metering Components

Figure 2:
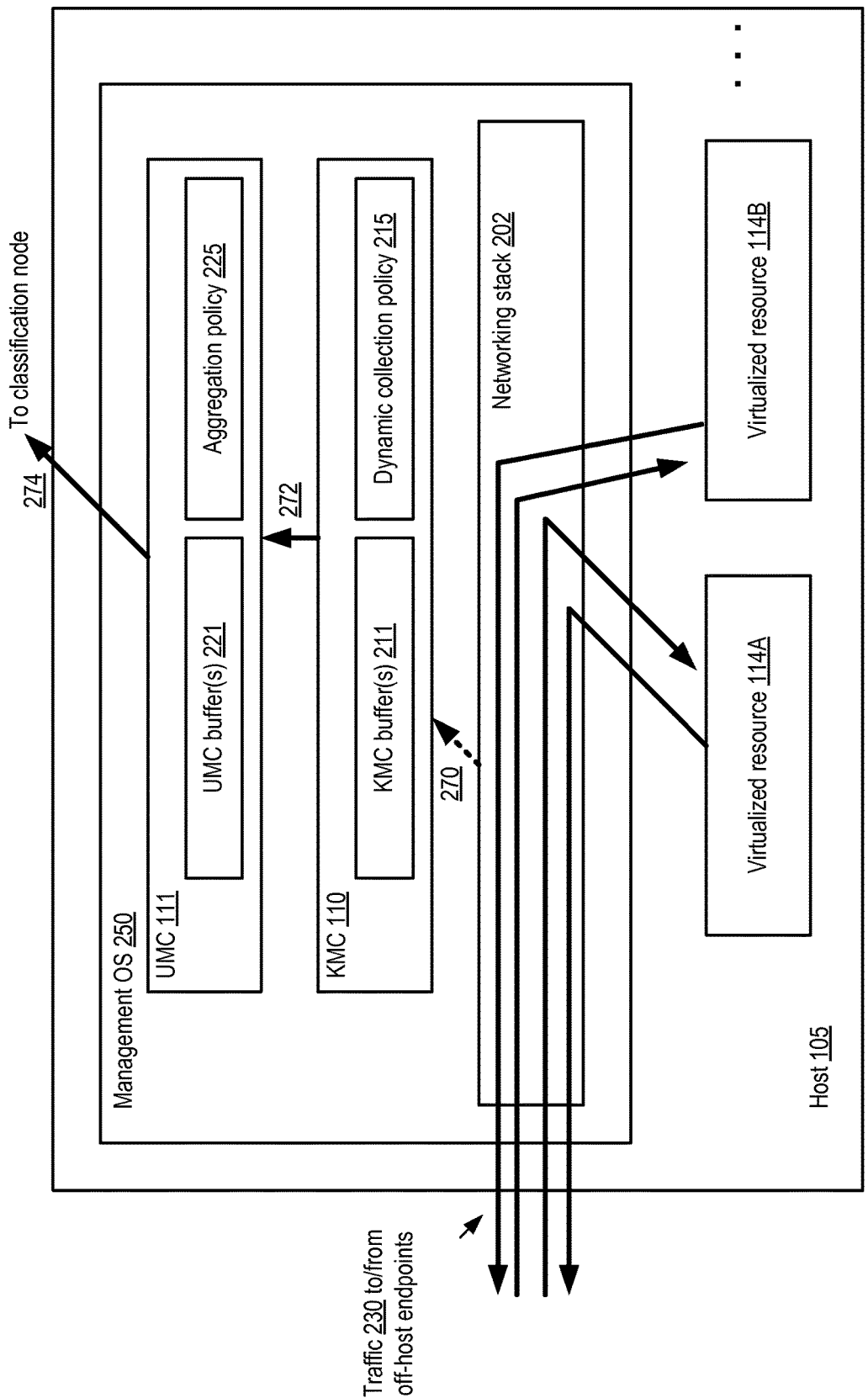
FIG. 2 illustrates metering components that may be implemented at a virtualization host, according to at least some embodiments.

FIG. 2 illustrates metering components that may be implemented at a virtualization host, according to at least some embodiments. As shown, incoming and outgoing network traffic 230 between off-host endpoints and virtualized resources such as 114A and 114B may pass through various layers of a networking stack 202 on their way to/from the virtualized resources 114. Portions or all of the networking stack 202 may be implemented as part of the management operating system 250 (i.e., the management software stack) at the host 105.

As indicated by the arrow labeled 270, kernel-mode metering component (KMC) 110 may be configured to capture metadata (such as the source and/or destination IP addresses, and the amount of data being transferred) from the networking stack 202, e.g., by inspecting packet header information. In at least some implementations, the KMC may be a lightweight module that introduces very little overhead to the networking-related processing at the OS 250, so as to minimize the impact on network latencies experienced by applications on the virtualized resources 114. As shown, in some embodiments, the KMC may store at least some of the collected metadata in a set of KMC buffers 211. In one embodiment, the KMC 110 may gather the metadata from the networking stack in accordance with a dynamic collection policy 215—e.g., for some periods of time, metadata may be gathered on every incoming or outgoing packet, while during other periods of time, metadata may be gathered only for some subset of the packets (e.g., for one in every N packets, or using a random sampling technique). The collection policy may be changed based on feedback received from the UMC 111 or a CN 180 in some embodiments, while in other embodiments the KMC itself may modify its metadata collection behavior or frequency (e.g., it may resort to sampling during one time interval if the number of distinct endpoint IP addresses for which metadata is captured exceeds a threshold number during an earlier time interval). In some embodiments KMC buffers 211 may not be implemented. A single, static collection policy may be used in one embodiment.

The KMC 110 may provide the collected networking metadata to the UMC 111, as indicated by the arrow labeled 272 in the embodiment illustrated in FIG. 2. UMC buffers 221 may be used to store and organize the metadata in some embodiments, before it is transmitted on to a classification node as indicated by the arrow labeled 274. The metadata may be combined into groups (e.g., based on the endpoint IP addresses, and/or on various elements of an aggregation policy 225, on which further details are provided below in conjunction with the description of FIG. 4) by the UMC before it is sent on to the CN. In one simple implementation, for example, the UMC may maintain respective byte counters for each distinct IP address for which metadata is received from the KMC, and transmit the IP addresses and the counters indicating the total number of bytes transferred to the CN. The UMC 111 may be responsible for optimizing the transmission of the metadata to the CNs in various ways in different embodiments—e.g., by omitting some of the metadata if the volume of the metadata collected is deemed too large, by compressing the metadata, and/or by changing the frequency at which the metadata is transmitted. In some embodiments, the UMC may also be responsible for providing feedback (e.g., to modify the collection policy 215) to the KMC 110 regarding the KMC's metadata collection operations.

In some embodiments a single metering component may be implemented at a virtualization host 105, instead of the KMC-UMC pair illustrated in FIG. 2. Such a combined metering component may be implemented either in kernel mode or in user mode. In one embodiment, two metering components with respective functions similar to those described above for the KMC and the UMC, i.e., one component whose primary function is gathering networking metadata including endpoint IP addresses, and another component whose primary function is aggregating the networking metadata and passing it on to a classification node, may both be implemented in kernel mode. In another embodiment, both such metering components may be implemented in user mode.

Metadata Record Contents

Figure 3:
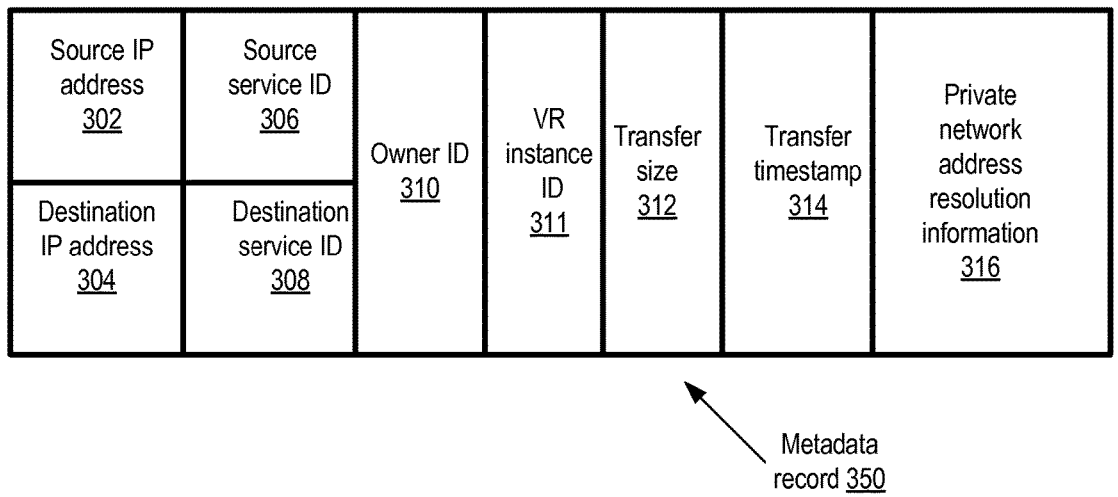
FIG. 3 illustrates example constituent elements of a networking metadata record used in a metering system, according to at least some embodiments.

FIG. 3 illustrates example constituent elements of a networking metadata record 350 used in a metering system, according to at least some embodiments. Values for some or all of the elements of record 350 may be ascertained by a metering component such as a KMC 110 in some embodiments, or by a combination of metering components such as a KMC 110 and a UMC 111 on a particular virtualization host 105. It is noted that for different implementations and for different transfers, not all the elements shown in FIG. 3 may be populated within a given metadata record—e.g., in some cases only a single service may be involved at both the sending and receiving end of the transfer, and as a result only one service identifier may be required.

As shown in FIG. 3, the metadata record 350 may comprise both a source and a destination IP address (elements 302 and 304 respectively) in some embodiments. In some implementations, when gathering metadata for a transmission from a virtualized resource 114 that is on the virtualization host and an off-host endpoint located on some other host, only the latter (off-host) endpoint's IP address may be recorded, for example because other information within the record 350 (such as the VR instance ID 311 discussed below) may be sufficient to identify the virtualized resource endpoint. In one implementation, a port number (e.g., a Transmission Control Protocol (TCP) port number) may also be included in the metadata record for the receiving end, the sending end, or both the receiving and sending end. In one implementation, an indication of a particular networking protocol used for the network transmission may be included. In some embodiments, a different provider network service may be associated with the traffic at the sender end than at the receiver end, and both a source service identifier 306 (corresponding to the sender end) and a destination service identifier 308 (corresponding to the receiver end) may be included in the record 350. For example, one endpoint of a particular transmission may comprise a virtual compute instance associated with a compute service, while the other endpoint may comprises a storage object associated with a storage service. If respective identification information about each service is not available, only one service identifier may be included in the record, or no service identifier may be included at all, and the service(s) involved may be identified at a later stage, e.g., by a CN 180 using the service address maps mentioned earlier.

In the depicted embodiment, the metering component generating the record 350 may include an identifier 310 of the particular client that "owns" the data transfer from a billing perspective in the record. Determining the owner ID 310 may not always be feasible when the metadata is initially collected, however (e.g., because the owner may be identifiable only at the other endpoint of the transfer, not at the host where the metadata is being collected), in which case ownership may be determined later (e.g., at the CN 180). As noted earlier, in some embodiments a virtualization host may comprise a plurality of virtualized resources (VRs) 114. A VR instance identifier 311 corresponding to the particular VR 114 involved in the data transfer may be included in the metadata record 350 in some embodiments. For example, if a particular virtualization host 105 has four different virtualized compute servers instances running, with respective instance identifiers I1, I2, I3 and I4, and the KMC 110 detects a network transmission from instance I1 to an off-host destination, the identifier I1 may be included in the metadata record 350 generated for that transmission.

In at least some embodiments, the transfer size 312 (e.g., the number of bytes transferred, either in the data portion of the transfer or in both the header portion and the data portion) may be recorded, together with a timestamp 314 indicating when the transfer was detected (which may correspond closely to when the transfer began or ended, depending on whether the transfer was outgoing or incoming with respect to the host 105). Timestamps may be recorded in a timezone-independent manner in some embodiments, e.g., based on the current Coordinated Universal Time (UTC) rather than the local time, or based on output obtained from a global timestamping service implemented in the provider network. In embodiments in which private networks are supported, additional private network address resolution information 316 may be included in the record 350 as well. For example, because IP addresses within private networks may not be unique with respect to addresses outside the private network and may thus require disambiguation, in one embodiment, element 316 may comprise an indicator that the source and/or destination IP address of the record 350 belongs to a private network, and as a result special treatment such as an extra step of address disambiguation may be needed for the record 350 at the UMC 111 or the CN 180.

In different embodiments, the granularity at which metadata records 350 are generated may differ. For example, in one embodiment, under normal operating conditions, a KMC 110 may create one such record for every packet of TCP/IP traffic. In another embodiment, a single record may be created for a plurality of packets. Additional elements beyond those shown in FIG. 3 may be included in the metadata records 350 in some embodiments (for example, in some implementations the KMC 110 may indicate in a record whether sampling was being used for metadata collection, or whether metadata for all packets was being collected at the time the record was generated). In at least one embodiment, the initial metadata record generated at a KMC 110 may include only a subset of the elements shown in FIG. 3, and other elements may be filled in as the metadata record is processed, e.g., by a UMC 111 and/or at a CN 180.

Aggregation Policies

Figure 4:
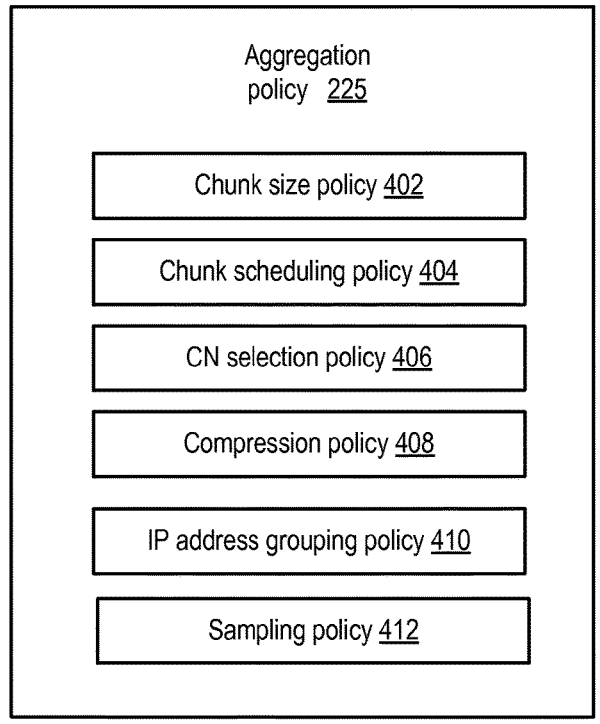
FIG. 4 illustrates example elements of an aggregation policy for networking metadata, according to at least some embodiments.

In at least some embodiments, as noted earlier, a UMC 111 may be responsible for aggregating metadata collected at a host 105 (e.g., accumulating the metadata for each distinct endpoint IP address) and transmitting it in an optimized fashion to a selected CN 180. Various aspects of the aggregation and transmittal of the metadata may be governed by an aggregation policy in some embodiments. FIG. 4 illustrates example elements of an aggregation policy for networking metadata, according to at least some embodiments.

In one embodiment, metadata collected at a host 105 may be transmitted to a selected CN 180 by a UMC 111 in units called "chunks"—for example, the default units for metadata transmission may be 256 Kilobyte chunks at a time. Chunk size policy 402 may determine the amount of networking metadata to be sent to the CN 180, and whether the chunk size can be changed dynamically (e.g., based on traffic levels between the UMC 111 and the CB 180, or based on the utilization level of the CN 180, smaller or larger chunks may be used than the default size in some embodiments). In some embodiments, chunk sizes may be expressed not in terms of the amount of metadata transferred, but in other units such as the cumulative data transfer size for which metadata is to be transmitted in a chunk (e.g., one chunk may be required for every 100 megabytes of data transferred), or the number of distinct endpoint addresses for which metadata is to be transferred at one time (e.g., metadata covering no more than 100,000 distinct endpoint IP addresses may be included in a given chunk). A chunk scheduling policy 404 may indicate how frequently networking metadata is to be transmitted from the UMC 111 (e.g., regardless of the amount of traffic detected at the host 105, a UMC 111 may be required to send a chunk of metadata to a CN at least once every N seconds in one implementation).

In embodiments in which the classification fleet 170 comprises a plurality of CNs 180, a CN selection policy 406 may govern how a particular UMC 111 is to determine the specific CN 180 to which metadata is to be transmitted. For example, CN selection policy 406 may statically assign a CN to each UMC, or allow the CN to be selected dynamically based on one or more criteria such as location (e.g., geographically closer CNs may be preferred to more distant ones), measured latencies (e.g., based on round-trip message times between the UMC and some set of CNs, the CN with the smallest round-trip message time may be selected), feedback from the CNs (e.g., an overloaded CN may request some UMCs to back off and utilize other CNs), or affinity (a UMC may be expected to continue providing metadata to the same CN for as long as possible, until guidance to the contrary is received at the UMC). A compression policy 408 may indicate whether compression is to be used when transmitting the metadata to the CN in some embodiments, and if compression is to be used, the particular compression methodology or algorithm that should be used.

An IP address grouping policy 410 may govern the granularity at which the metadata is to be combined at the UMC 111 before transmittal to the CN 180. For example, according to one simple grouping policy, the UMC 111 may be required to collect metadata (e.g., transfer sizes) for each endpoint IP address A.B.C.D for which metadata records are available. However, if the virtualized resources 114 at a given host 105 are detected as communicating with a very large number of distinct IP addresses, the grouping policy 410 may allow the UMC to combine metadata at a different granularity—e.g., metadata for all the IP addresses in the A.B.C.* range may be combined together for transmittal to the CN. The number of distinct IP addresses to (or from) which transfers occur at a given host may per unit time may be referred to as "IP fanout" or "IP density" herein. When IP fanout or IP density increases beyond a threshold defined in the grouping policy 410, the UMC 111 may be allowed to temporarily change the aggregation granularity (e.g., according to one grouping policy, if the IP fanout exceeds F1, metadata for up to 16 IP addresses may be combined for the next N1 seconds at the UMC, and if the IP fanout increases to F2, metadata for up to 256 IP addresses may be combined for the next N2 seconds). Grouping information about several IP addresses into one entry may reduce the precision of the categorized usage records generated at the CN in some cases (e.g., some network transfers may potentially be misclassified). However, in general, a given service (and a given client) may typically use a number of consecutive IP addresses within a range, so a grouping policy 410 that combined traffic amounts for a contiguous (and usually small) range of IP addresses may often still result in accurate usage records, while successfully reducing the overhead that may result from excessively large IP fanout. In one embodiment, in addition to or instead of grouping data for multiple IP addresses, the UMC 111 and/or the KMC 110 may initiate operations to actively curb or throttle a large increase in IP fanout, e.g., by causing packets for some sets of IP addresses to be dropped at the management operating system network stack. In such an embodiment, if the number of distinct IP addresses to which communication occurs over a given set of time intervals increases beyond a threshold, packets directed to (or received from) some selected set of IP addresses (e.g., randomly selected IP addresses) may be discarded instead of being delivered to their intended destinations.

In some embodiments, a sampling policy 412 may govern whether (and under what circumstances) the networking metadata is to be sampled instead of being collected for each data transfer. For example, the sampling policy 412 may indicate conditions under which the UMC 111 is to instruct its corresponding KMC 110 to stop collecting metadata for each packet and start collecting metadata for a sampled subset of the packets. The sampling policy 412 may also indicate the sampling technique to be used (e.g., reservoir sampling) in some embodiments. In one embodiment, sampling may be performed at either the KMC 110 (e.g., in response to guidance from the UMC 111 or at the KMC's own initiative), the UMC 111 (e.g., the UMC may only combine metadata for a sampled subset of the records received from the KMC in accordance with a UMC sampling policy 412), or at both the KMC and the UMC. In at least some embodiments, not all the elements of the aggregation policy 225 may be used, and in other embodiments, an aggregation policy 225 may include other elements not shown in FIG. 4. It is noted that at least in some embodiments, CNs 180 and/or billing nodes 185 may aggregate data that they receive in accordance with respective aggregation policies—for example, a CN 180 may aggregate metadata received over one or more time windows to generate the usage records, and a billing node 185 may aggregate numerous usage records associated with a single client when determining a billing amount.

Classification Node Operations

Figure 5:
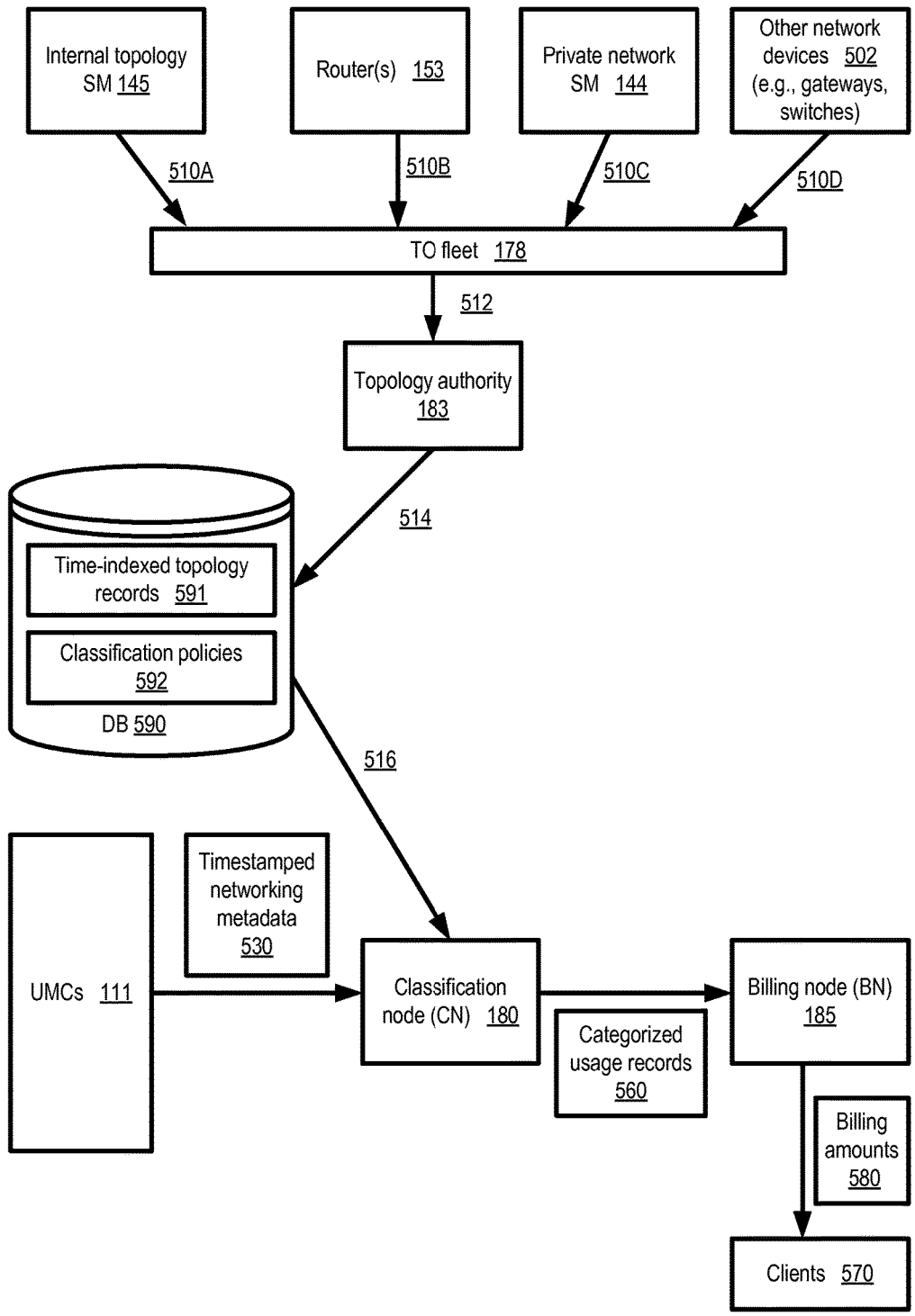
FIG. 5 illustrates example interactions between a traffic classification node and other elements of a distributed metering system, according to at least some embodiments.

FIG. 5 illustrates example interactions between a traffic classification node (CN 180) and other elements of a distributed metering system, according to at least some embodiments. A CN's primary responsibility may comprise generating categorized usage records 560 usable by billing nodes 185 to determine billing amounts 580 for network traffic incurred on behalf of clients 570 in the depicted embodiment. As described earlier, in some embodiments the billing amounts ultimately charged to clients of the provider network for a given amount of network bandwidth consumed may depend on characteristics of the endpoint addresses involved—e.g., whether the network traffic was between two addresses within the provider network (as in the case of local-provider-network traffic category or the inter-region-provider-network category mentioned earlier), whether a private direct link was used, whether the traffic exited the provider network's internal network and used the public Internet, for example. The usage records produced by a CN 180 may include an indication of such endpoint characteristics, and may also determine or confirm ownership (in the sense of billing responsibility) for each data transfer, as well as the service(s) associated with billing for each data transfer, enabling the billing nodes 185 to generate fair and accurate billing amounts 580. It may be possible in some embodiments that a given network transfer may involve the use by a client of more than one service of the provider network—e.g., a file stored using a storage service may be transferred at the request of a computation being performed at a virtualized compute server instance instantiated using a compute service. In such scenarios, at least in some embodiments, the client may, at least in principle, be responsible for billable network usage associated with the storage service, and also for billable network usage associated with the compute service. The CN 180 may be responsible for determining the service context for billing for the network usage—e.g., whether the client should be billed for network usage associated with the storage service, the compute service, or both services. Classification policies 592, described below in further detail, may be used to determine service contexts in some embodiments. In at least some scenarios, it may be the case that multiple IP addresses may be used to provide a given service to a given client's devices, and as a result the CN may have to combine metadata for different IP addresses when determining the categorized usage records.

As indicated by the arrows labeled 510A, 510B, 510C and 510D, a topology observer fleet 178 may collect networking configuration change information from a variety of sources in the depicted embodiment, which may be consolidated by a topology authority 183 for eventual use by the CN 180. The sources may include internal topology SM 145 and various routers 153 (some of which may be associated with client networks employing private direct physical links 127 for connectivity to the provider network). In some embodiments the TO fleet 178 may also collect configuration information regarding private networks set up on behalf of various clients by a private network SM 144. In at least one embodiment, the TO fleet 178 may collect networking configuration data from a variety of other network devices 502, such as gateways or switches. As shown, the networking configuration information may be transmitted from the TO nodes of the fleet 178 to a topology authority 183. The topology authority 183 may consolidate the collected configuration information and store it in a database 590 in the form of time-indexed topology records 591 in the depicted embodiment, as indicated by the arrow labeled 514. In at least some embodiments, the topology authority 183 may also store various types of classification policies 592 in the database 590. Classification policies 592 may be used by the CN to resolve potential IP address ownership ambiguities or usage category ambiguities in some embodiments. Classification policies 592 may also include information about how long network routing status changes or configuration changes have to remain in effect to be considered valid in some implementations—e.g., short-term network disruptions of less than N seconds may be ignored when generating categorized usage records 560.

The CN 180 may receive timestamped networking metadata 530 from the UMCs 111 at various hosts 105, comprising information about endpoint addresses and transfer sizes initially obtained by KMCs 110 and aggregated on the basis of endpoint IP addresses by the UMCs. The CN 180 may access the time-indexed network topology records 591 and the classification policies 592 from database 590. In one implementation, the CN 180 may be provided read-only access to the database 590, while the topology authority 183 may be provided read-write access to the database. In some embodiments, the time-indexed topology records may include service address maps—e.g., the set of IP addresses associated with providing a particular service of the provider network at a particular time may be included in the topology records 591. Information indicating the time periods during which a particular networking and/or service configuration was in effect may be crucial to ensure the correctness of the categorized usage records generated by the CN 180 in at least some embodiments in which networking configurations can be modified dynamically. For example, consider a scenario in which a particular IP address K.L.M.N is initially associated with a particular service 51 for which traffic billing rates are $r1 per megabyte. At a particular time T1, a routing change occurs (e.g., via a new route announcement made using BGP by a router 153), and as result traffic associated with service S1 is directed to IP address K.L.M.P instead, while traffic directed to K.L.M.N after T2 should be billed at a default rate $rd per megabyte. When determining whether a given network transfer NT1 that occurred with K.L.M.N as a destination at time T2 should be billed at S1's service rate $r1, or the default rate $r2, the CN 180 may have to take into account whether T2 was later or earlier than T1. If T1 was prior to T2, then the usage record for NT1 should indicate the usage category with rate $rd, while if T1 was after T2, then the usage record for NT1 should indicate the usage category with rate $r1.

Using the database 590, the CN 180 may be able to look up the state of the network topology as of the time of a given network data transfer for which metadata 530 is received. For example, one record 591 may indicate the network topology of a subset of the provider network (including details such as which client owned which set of IP addresses, and which services were employing which IP addresses) for the time range 10:00:00 UTC-10:00:15 UTC on a given date, and if metadata for a network transfer that took place at 10:00:07 UTC is received, the CN may consult that record 591 to generate the corresponding categorized usage record (s) 560. In some embodiments, a single database 590 may be shared by multiple CNs 180, while in other embodiments, each CN may maintain its own database instance or replica.

In at least one embodiment, in addition to generating categorized usage records 560, a CN 180 may also be configured to perform various types of auditing operations. For example, if the collected metadata indicates that G1 gigabytes of data was directed from virtualized compute resources 114 with address range R1 at a set of hosts 105 to a storage service accessible via IP address range R2 during a time window TW1, the CN 180 may verify (using metadata collected from the IP address range R2) whether G1 gigabytes of data were in fact received at the targeted IP address range from address range R1 during TW1. If a discrepancy is detected between the amount of data that was supposed to have been sent, and the amount of data that was actually received, an investigative analysis (e.g., involving inspection of log records) may be initiated. In some embodiments, the CN 180 may be configured to perform such auditing or verification operations for randomly selected data transfers and/or time windows according to a schedule, or at random intervals.

Metering Traffic Associated with Private Networks

In some embodiments in which private networks are supported, at least some of the topology information used by the CNs may need to include additional data, relative to the data required for traffic unassociated with private networks. For example, because a given client may be able to assign arbitrary IP addresses to resources within the client's private network, and such arbitrary IP addresses may overlap with addresses assigned to resources outside the client's private network, each client using a private network may effectively have a corresponding networking topology that is applicable specifically to that client, and not to other clients. Consider a scenario in which private network SM 144 establishes a private network PN1 for client C1, and C1 assigns an IP address R.S.T.U to a device D1 within the private network. At the same time, somewhere else in the provider network, the IP address R.S.T.U is assigned to another device D2. Any traffic with a destination address R.S.T.U originating at a location within the private network PN1 may be directed to device D1, whereas if the traffic originates at a location outside the private network PN1, it may be directed to device D2. If a CN 180 eventually receives metadata indicating R.S.T.U as an endpoint for a network transfer, the CN 180 may have to determine whether the traffic originated from within the private network PN1 or not. Other clients C2 and C3 may also, at least in principle, have assigned R.S.T.U to devices within their own private networks, and client C1 could also have assigned R.S.T.U to another device in a different private network PN2. As a result the network topology information used by the CN 180 may have to include added dimensions indicating the specific clients (or client private networks) with which the topology is to be associated.

In at least one embodiment, clients may also set up gateways between their private networks inside the provider network 102, and the client networks (such as networks 130A or 130B of FIG. 1) external to the provider network, e.g., in a client's own data center. This configuration may allow IP addresses set up for resources in the private network to communicate with IP addresses in the client network using a gateway. Such traffic may be routed over a virtual private network (VPN) tunnel in some implementations. Clients may configure their VPN tunnels to either use BGP to announce private routes in some embodiments, or the clients may invoke special APIs to register static routes to be used for their VPN in other embodiments. The KMCs and the UMCs may collect per-IP address metadata for such VPN clients and send the metadata on to the classification fleet in the manner described above. The CNs 180 (and/or the topology authority 183) may then examine per-client routing tables maintained by the VPN service in order to generate the categorized usage records in such embodiments—for example, a different usage category and corresponding billing rate may be established for VPN traffic as opposed to other traffic within the private network.

Methods for Traffic Metering and Classification

Figure 6:
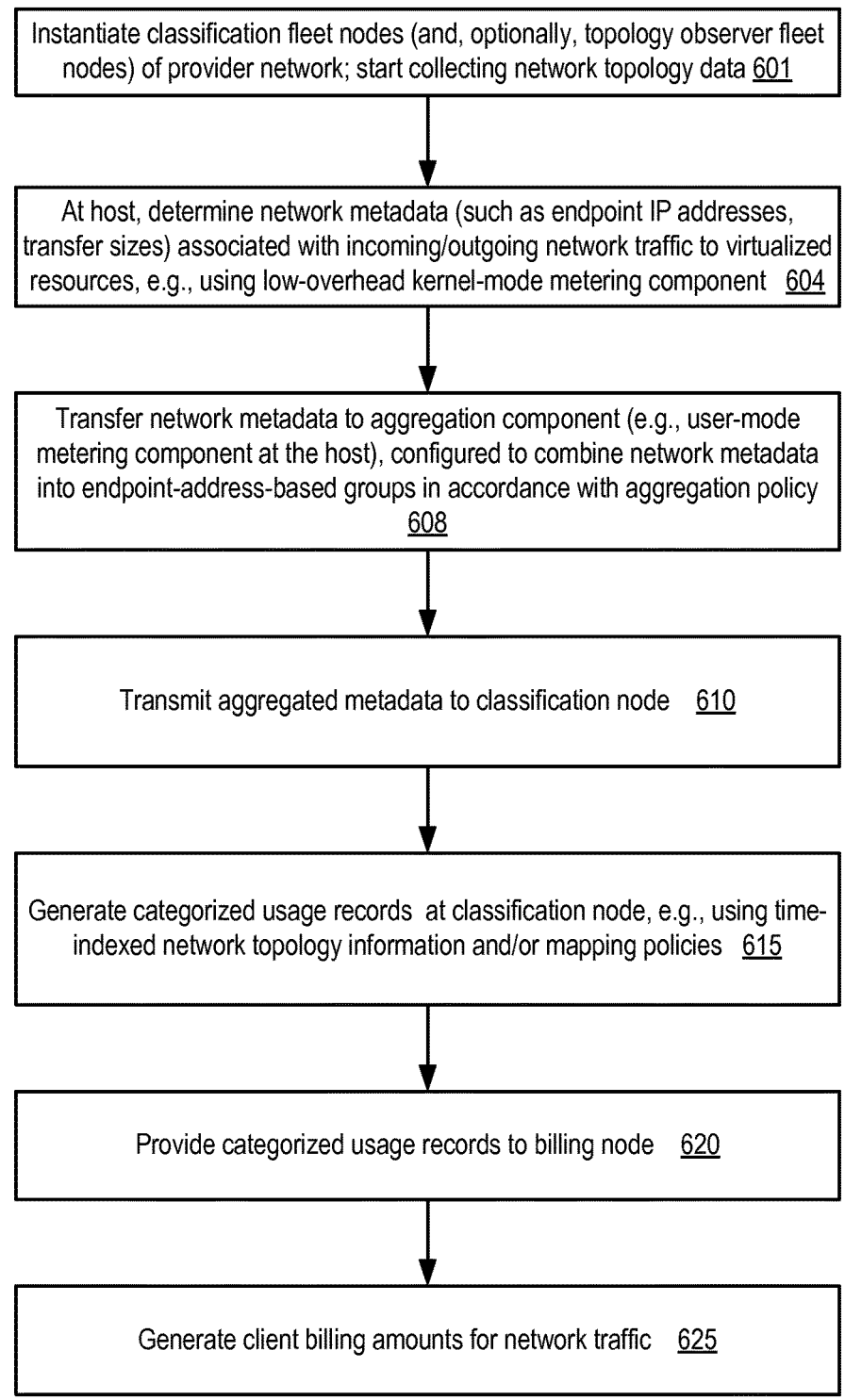
FIG. 6 is a flow diagram illustrating aspects of operations that may collectively implement endpoint address-based metering in a distributed fashion in a provider network, according to at least some embodiments.

FIG. 6 is a flow diagram illustrating aspects of operations that may collectively be performed to implement endpoint address-based metering in a distributed fashion in a provider network, according to at least some embodiments. As shown in element 601, one or more nodes of a traffic classification fleet (i.e., CNs 180) may be instantiated at a provider network 102, and information about network topology changes may be collected. In some embodiments, topology observer nodes 188 and a topology authority 183 may also be instantiated, e.g., to monitor routing advertisements and other network configuration changes, and to provide time-stamped topology data for eventual use by CNs. In some embodiments the time-indexed topology representations or records may be stored in a database (e.g., the topology authority 183 may consolidate configuration data collected by the TO nodes and write the consolidated data to the database). In one embodiment, at least a subset of the time-indexed topology representations may include an identification of a client for which the topology is valid—e.g., different topologies may be applicable for different clients, as discussed above in the context of the use of private networks and/or VPNs.

As shown in element 604 of FIG. 6, networking metadata including endpoint IP addresses and transfer sizes may be determined for network transmissions at a given virtualization host, for example by a lightweight, low-overhead kernel-mode metering component (KMC) 110. In some embodiments, depending on the information available, the KMC or a similar metering component may also collect other types of metadata for the network transfer (such as the service(s) involved, or the identity of the client that owns the data), similar to the types of elements of record 350 illustrated in FIG. 3. The metadata may be gathered for every data transfer (e.g., every TCP/IP packet) in some embodiments by default, although the collection mode may be dynamically changed to sampling in at least some embodiments, so that metadata for only a subset of transfers is collected when appropriate.

The metadata collected may be provided or transmitted to an aggregation component, such as a user-mode metering component (UMC) 111 in some embodiments, as indicated in element 608 of FIG. 6. The aggregation component may be configured to combine the metadata into groups, e.g., one group per unique endpoint IP address, or one group for a range of IP addresses. In some embodiments, various aspects of the aggregation process and the transmission of the aggregated metadata to classification nodes may be governed by an on-host aggregation policy such as that illustrated in FIG. 4. The aggregation policy may include grouping guidelines or policies, chunking guidelines (indicating how much data should be transmitted to classification nodes at a time, and/or the frequency of transmissions by a UMC to a CN), compression guidelines, and so on. In accordance with the aggregation policy, the metadata may be transmitted to a classification node 180 (element 610).

At the classification node 180, the aggregated metadata may be used to generate categorized usage records, e.g., using the time-indexed network topology representations and/or various mapping or classification policies (element 615). Several different types of usage categories (and corresponding billing rates for bandwidth use) may be defined in various embodiments, such as a local-provider-network category for traffic that remains within a local network boundary such as a data center or a collection of data centers of the provider network, an inter-region-provider-network category for traffic that crosses a geographical region boundary defined for the provider network but does not leave the provider network, an extra-provider-network category for traffic that utilizes at least one network link outside the provider network, various service-based usage categories corresponding to different services supported at the provider network, private-network-related categories for traffic that is associated with network addresses belonging to a client's private network or VPN, link-based usage categories such as a category for traffic that flows along a direct private link established at an edge node of the provider network to a client network, and so on. Mapping or classification policies may indicate the precedence between different usage categories in cases where more than one usage category may be applicable—for example, in one embodiment, an overall default classification policy may indicate that when two or more usage categories are applicable or whenever there is any doubt about exactly which usage category a network transmission should be mapped to, the usage category with the cheapest rate among the candidate usage categories should be selected. Another mapping policy may indicate, for example, that if a given network transfer can be mapped to two different usage categories corresponding to respective services S1 and S2, it should be mapped to the usage category associated with S1.

The categorized usage records generated by the classification node 180 may be provided to a billing node of the provider network (element 620). At the billing node, the billing amounts to be charged to clients for their use of network bandwidth may be generated (element 625) in the depicted embodiment. In some embodiments, billing records may be generated at the CNs themselves, e.g., the functions of generating categorized usage records and generating billing amounts may be performed by or at the same nodes of the provider network.

Figure 7:
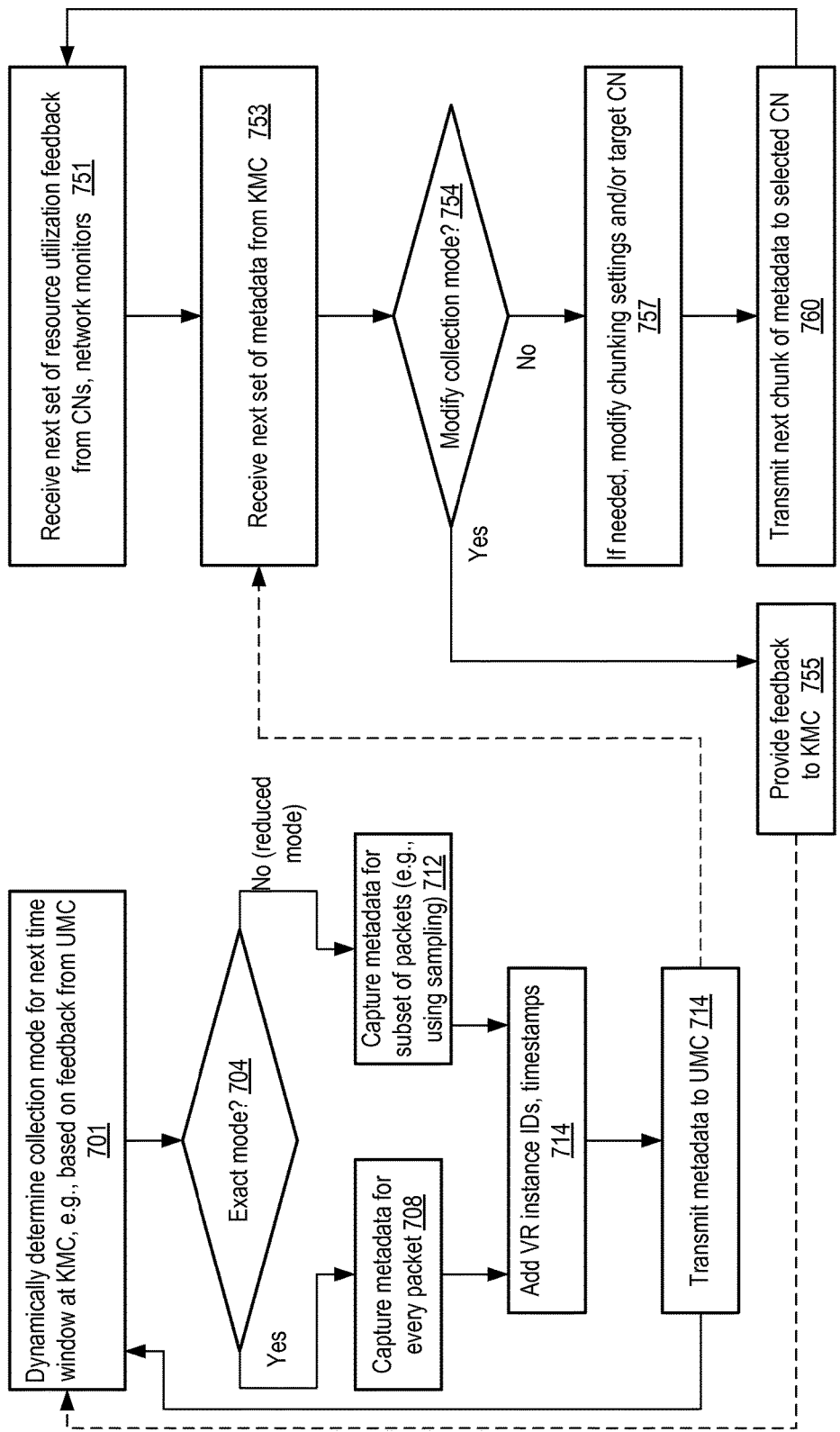
FIG. 7 is a flow diagram illustrating aspects of operations that may be performed by a kernel-mode metering component and a user-mode metering component at a virtualization host, according to at least some embodiments.

FIG. 7 is a flow diagram illustrating aspects of operations that may be performed by a kernel-mode metering component (e.g., a KMC 110) and a user-mode metering component (e.g., a UMC 111) at a virtualization host, according to at least some embodiments. Operations of the KMC 110 are illustrated in the left half of FIG. 7, while operations of the UMC 111 are illustrated in the right half. As shown in element 701, a KMC 110 may dynamically determine a metering mode or collection mode for network metadata collection during the next time window (e.g., X seconds or minutes). The collection mode may be determined based on various factors, such as IP fanout observed during a recent time window, the memory or compute resources available to the KMC, the collection policy 215 in effect, and/or based on feedback received from a corresponding UMC 111 or some other component of the provider network 102. In the depicted embodiment, two examples of collection modes are illustrated: exact collection, in which metadata for each network transmission or packet is collected, and reduced mode, in which metadata for only a subset of transmissions or packets is collected. If the exact mode is selected for the next time window (as determined in element 704), metadata such as endpoint address information may be gathered for each transmission or packet (element 708). If the reduced mode is selected (as also determined in element 704), metadata may be captured for only a subset of the transmissions or packets, e.g., using a sampling technique (element 712). In the depicted embodiment, regardless of whether the exact mode or the reduced mode is used for metadata collection, the KMC may add a timestamp and a virtualized resource ID to the metadata (element 714), and transmit the metadata to the UMC 111 (element 714). The KMC may then determine the collection mode for the next time window and repeat operations corresponding to the elements 701 onwards.

The UMC 111 may be configured to receive feedback from CNs 180 and/or from network monitors of the provider network 102 in the depicted embodiment (element 751). The feedback may indicate, for example, how busy a CN is, or how busy the network paths between the UMC and a CN are, which may help the UMC 111 to determine whether the amount of metadata collected or the rate at which it is transmitted to the CN should be changed. The UMC 111 may receive the next set of metadata from the KMC 110 (element 753). Based on the feedback from the CNs and/or network monitors and/or based on the amount of metadata received from the KMC 110 (which may be indicative of the IP fanout at the host), the UMC 111 may determine whether the collection mode at the KMC 110 should be modified (element 754). If the UMC determines that the mode should be modified, it may provide appropriate feedback to the KMC (element 755). The feedback mode may, for example, indicate to the KMC 110 that from the UMC's perspective, it is acceptable to switch to exact mode from the current reduced mode, or that it is advisable to switch from exact mode to reduced mode. The KMC 110 may or may not change the collection mode based on the feedback—e.g., if resource constraints at the KMC itself are detected, in one embodiment the KMC may determine the collection mode based on those resource constraints regardless of the feedback received from the UMC.

The UMC 111 may modify its aggregation parameters (such as the grouping technique used, chunk sizes or chunk transmission schedule for transferring metadata to the CN 180), e.g., based on the feedback from the CNs or the amount of data received from the KMC 110 in the depicted embodiment (element 757). In one embodiment in which multiple CNs are implemented, the UMC 111 may select a different CN for its next transmission of aggregated metadata—e.g., if the network paths to the previously-used CN are over-utilized or if the previously-used CN is overloaded. The next metadata chunk may then be transmitted to the appropriate CN (element 760). The UMC 111 may wait to receive the next set of feedback from the CNs or network monitor and/or the next set of metadata from the KMC 110, and repeat the operations corresponding to elements 751 onwards.

Figure 8:
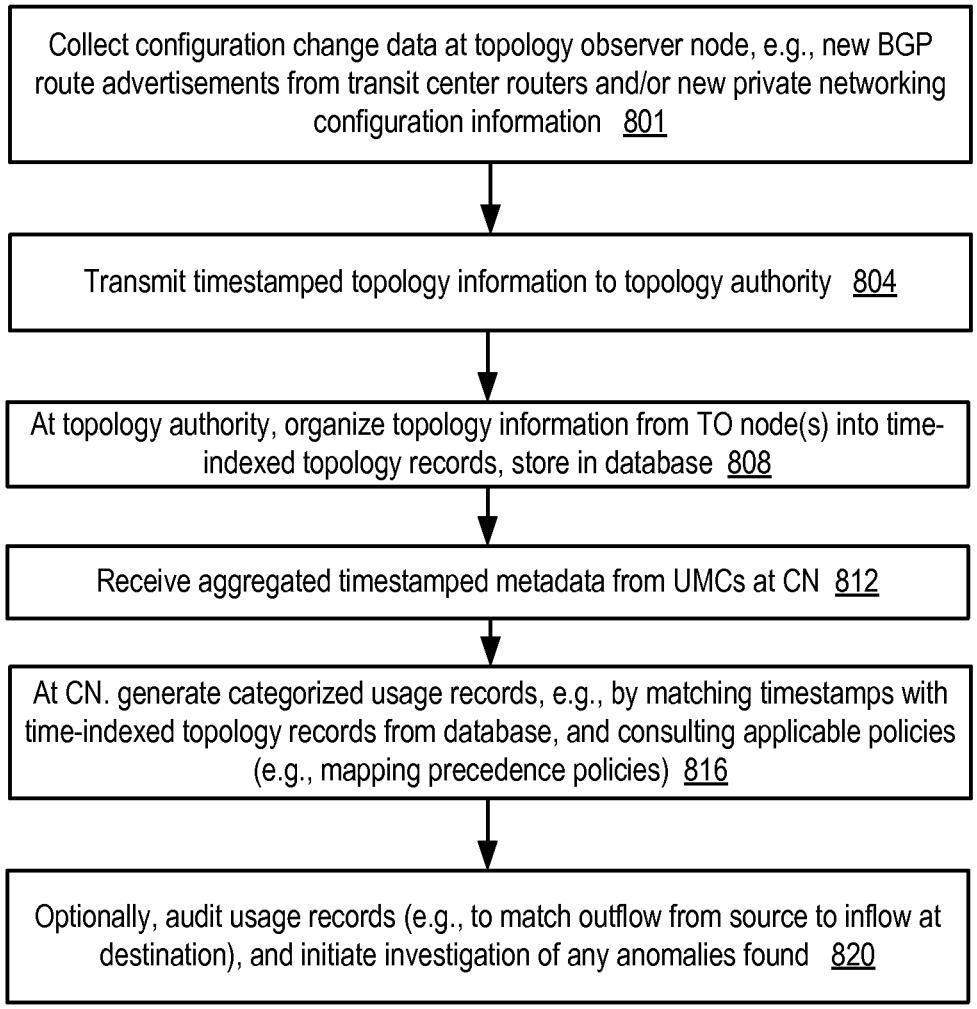
FIG. 8 is a flow diagram illustrating aspects of operations that may be performed to generate time-indexed network topology information, according to at least some embodiments.

FIG. 8 is a flow diagram illustrating aspects of operations that may be performed to generate time-indexed network topology information, according to at least some embodiments. As shown in element 801, information regarding networking configuration changes may be collected at a topology observer (TO) node 188. The information may be collected by detecting BGP routing advertisements in some embodiments, e.g., from routers at transit centers 152 or other edge locations of the provider network, from networking devices at client networks 130, from various service managers for the services implemented in the provider network, and/or from routers associated with the public Internet. In some embodiments, a TO node 188 may also collect information about newly established private networks, or changes to private network configurations, e.g. from a private network service manager 144. In one embodiment, information about changes to the network routes used within the provider network may be obtained from an internal topology SM 145. Using the collected information, a TO node 188 may transmit timestamped topology information to a topology authority 183 (element 804). In some embodiments, the timestamp associated with a given set of topology information may be implicit—e.g., if a topology authority 183 receives topology information from a TO node 188 at time T1 and later at time T2, and neither set of topology information includes an explicit timestamp, the topology information received at time T2 may be assumed to be applicable starting approximately at time (T1+T2)/2 (or at time T1+delta, where delta is some small time interval).

At the topology authority 183, the timestamped topology information received from one or more TO nodes 188 may be organized into time-indexed networking topology records, and may be stored in a database (element 808) in the depicted embodiment. The time-indexed records may be used by a CN to determine, for any given networking transmission that occurs at a given time Tk whose metadata is received later at the CN, the network topology that was in effect at time Tk. In some large provider networks, separate topology records may be stored for various sub-portions of the network in some embodiments. As indicated above, in some embodiments, respective time-indexed topology network representations may be maintained for different clients, since at least some of the clients may have set up private networks and so may have established network configurations that are only applicable to them and not to other clients.

When aggregated metadata (with associated timing information for the network transmissions represented in the metadata) is received at the CN (element 812), categorized usage records may be generated for the metadata (element 816), e.g., by matching the timing of the transmissions with the time-indexed topology records. The categorized usage records may then be transmitted to billing nodes 185 in some embodiments. In some embodiments, as noted earlier, the CN 180 may also optionally be configured to perform auditing functions, in which for example the net outflow of traffic from one set of source nodes of the provider network is compared to the actual inflow of network traffic at the assumed destination nodes, and an investigation may be initiated if anomalies are detected (element 820).

It is noted that in various embodiments, some of the operations illustrated in FIGS. 6, 7 and 8 may not be performed in the order shown, or may be performed in parallel. In some embodiments, some of the illustrated operations may be omitted—for example, topology observer nodes may not be implemented in one embodiment, and the operations illustrated in element 801 may not be performed in such an embodiment, or may be performed at a different component of the provider network.

Use Cases

The techniques described above, of implementing efficient address-based metering of network traffic, may be useful for provider networks in a variety of different scenarios. For example, as provider networks grow to larger and larger sizes, and as the variety of services offered in the provider network increases, metering network traffic based on service API calls alone may not suffice, since a significant fraction of the traffic may not be linkable to specific service API calls. Furthermore, as the number of distinct IP addresses to which traffic flows from a given virtualization host of the provider network increases, it may not be practicable to perform all aspects of the metering process on the virtualization host itself. Such an approach may, for example, require topology information about the entire network to be replicated at the virtualization hosts, which may consume far too many resources (e.g., memory or CPU cycles) that should ideally be devoted to client workloads.

The introduction of features such as private and direct physical links to client networks at transit centers, as well as private networks and VPNs between private networks and client networks, may also add to the topology information that is needed for accurate assignment of network traffic to clients. The use of a distributed metering system with distinct sets of components responsible for low-level metering, topology change observation, and classifying traffic into usage categories for billing purposes may be especially beneficial in such scenarios.

Illustrative Computer System

Figure 9:
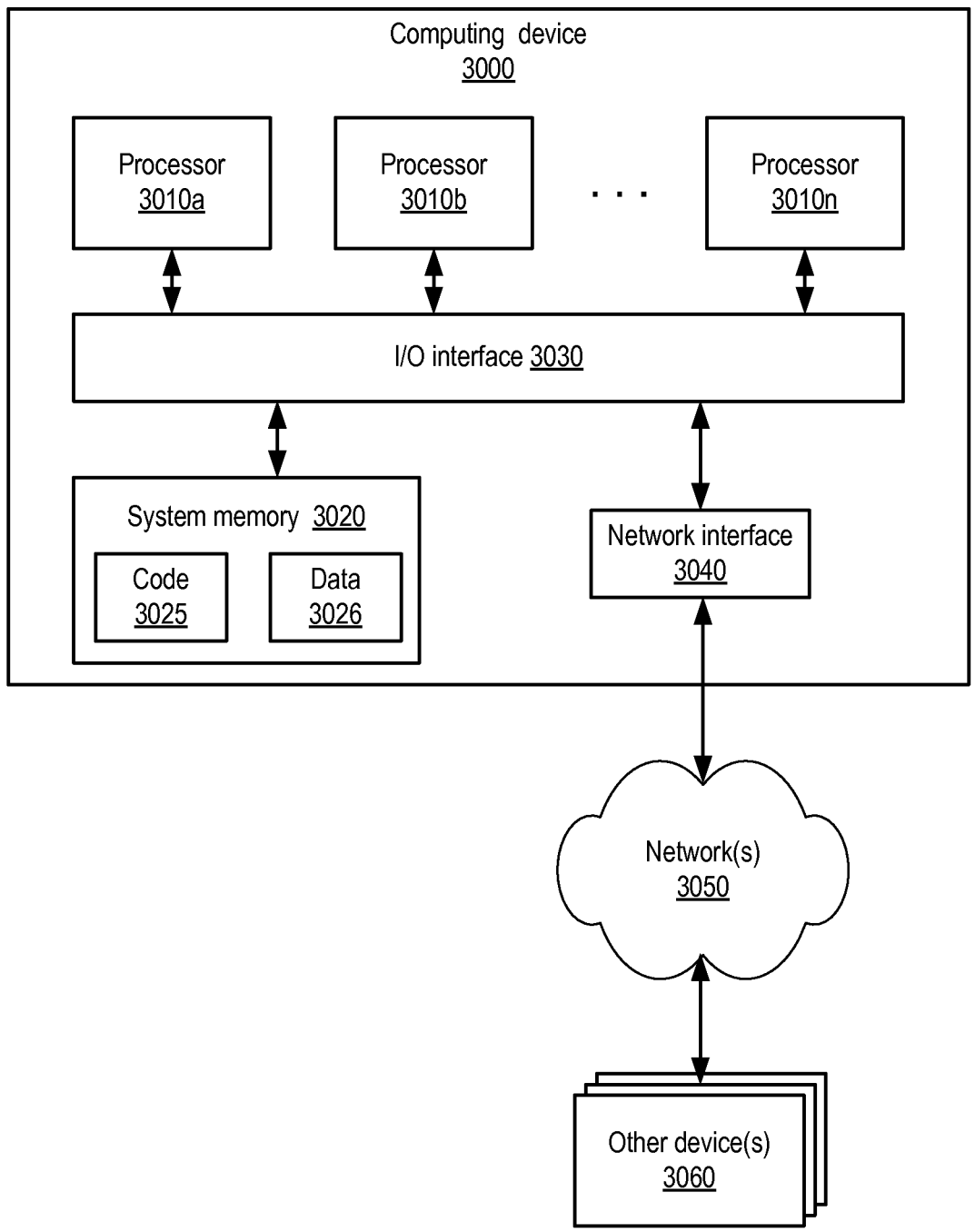
FIG. 9 is a block diagram illustrating an example computing device that may be used in at least some embodiments.

In at least some embodiments, a server that implements a portion or all of one or more of the technologies described herein, including the techniques to implement the KMCs 110, the UMCs 111, the CNs 180, the topology authority 183 and/or the TO nodes 188, may include a general-purpose computer system that includes or is configured to access one or more computer-accessible media. FIG. 9 illustrates such a general-purpose computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010, or a multiprocessor system including several processors 3010 (e.g., two, four, eight, or another suitable number). Processors 3010 may be any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050, such as other computer systems or devices as illustrated in FIG. 1 through FIG. 8, including various devices serving as clients, for example. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-accessible medium configured to store program instructions and data as described above for FIG. 1 through FIG. 8 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 3000 via I/O interface 3030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-accessible medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 9 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
a plurality of computing devices comprising one or more hardware processors and memory and configured to:
determine, at a first metering component on a host of a provider network comprising a plurality of hosts, networking metadata comprising (a) endpoint address information and (b) a traffic metric, wherein the networking metadata is associated with one or more network transmissions for which at least one endpoint comprises a virtualized resource instantiated at the host;
provide, by the first metering component to a second metering component on the host, at least a subset of the networking metadata determined at the first metering component;
aggregate at least the subset of the networking metadata from at least the first metering component at the second metering component in accordance with an on-host aggregation policy;
transmit, from the second metering component to a traffic classification node of the provider network, aggregated networking metadata based on the aggregation of at least the subset of the networking metadata;
generate, at the traffic classification node, a set of categorized usage records based at least in part on aggregated networking metadata obtained from at least a subset of the plurality of hosts and based at least in part on a representation of a network topology associated with the provider network, wherein the representation of the network topology indicates different networking configurations of the provider network that correspond to different time periods, and wherein a particular usage record of the set of categorized usage records indicates a particular billable usage category to be associated with the one or more network transmissions;
provide the set of categorized usage records from the traffic classification node to a billing node of the provider network;
determine, using the set of categorized usage records, a billing amount to be charged for the one or more network transmissions at the billing node; and
transmit the billing amount to a client device.

2. The system as recited in claim 1, wherein the first metering component comprises a kernel-mode component of a management software stack at the host, and wherein the second metering component comprises a user-mode component of the management software stack.

3. The system as recited in claim 1, wherein the one or more network transmissions comprise a set of network packets for which one endpoint comprises the virtualized resource instantiated at the host, wherein a second endpoint of the set has a particular Internet Protocol (IP) address, wherein the address endpoint information comprises the particular IP address, wherein the traffic metric comprises a number of bytes transmitted in the set of network packets, and wherein the networking metadata includes identification information of the virtualized resource distinguishing the virtualized resource from a different virtualized resource instantiated on the host.

4. The system as recited in claim 1, wherein the on-host aggregation policy comprises one or more of (a) a chunk size determination policy usable to determine an amount of aggregated networking metadata to be transmitted to the classification node, (b) a chunk scheduling policy usable to determine a schedule in accordance with which the aggregated networking metadata is to be transmitted to the classification node, (c) a classification node selection policy, (d) a compression policy for transmission of the aggregated networking metadata, (e) a grouping policy usable to combine networking metadata for a set of IP addresses prior to transmitting the aggregated networking metadata, or (f) a sampling policy usable to select a subset of the aggregated networking metadata to be transmitted to the classification node.

5. The system as recited in claim 1, wherein the plurality of computing devices are configured to:

collect, at one or more topology observer nodes of the provider network, network configuration information comprising routing information associated with at least a portion of the provider network; and transmit the network configuration information and an associated timestamp to a topology authority node configured to, generate the representation of the network topology based at least in part on the routing information and the associated timestamp.

6. The system as recited in claim 1, wherein the particular billable usage category comprises at least one of: (a) a local-provider-network category, (b) an inter-region-provider-network category (c) an extra-provider-network category, (d) a category associated with a particular multi-tenant service implemented at the provider network, (e) a category associated with a private network established within the provider network on behalf of a client, or (f) a category associated with a direct physical network link established at an edge node of the provider network to connect a client network with the provider network.

7. The system as recited in claim 1, wherein the plurality of computing devices are configured to:

determine whether networking metadata records are to be collected corresponding to each network transmission during a particular time period, based at least in part on a count of a number of distinct endpoint addresses associated with network transmissions detected during another time period; and in response to a determination that networking metadata records corresponding to each network transmission are not to be collected, utilize a sampling methodology to generate one or more networking metadata records during the particular time period.

8. The system as recited in claim 1, wherein the representation of the network topology is time-indexed and is based at least in part on network configuration information, and wherein the network configuration information comprises one or more timestamps associated with a routing change.

9. A method, comprising:

determining, at a first metering component on a host of a provider network comprising a plurality of hosts, networking metadata comprising (a) endpoint address information and (b) a traffic metric, wherein the networking metadata is associated with one or more network transmissions for which at least one endpoint comprises a virtualized resource instantiated at the host;

providing, by the first metering component to a second metering component on the host, at least a subset of the networking metadata determined at the first metering component;

aggregating at least the subset of networking metadata from at least the first metering component at the second metering component in accordance with an on-host aggregation policy;

transmitting, from the second metering component to a traffic classification node of the provider network, aggregated networking metadata based on the aggregation of at least the subset of the networking metadata;

generating, at the traffic classification node of the provider network, one or more categorized usage records corresponding to the one or more network transmissions, based at least in part on the aggregated networking metadata obtained from at least the second metering component and based at least in part on a representation of a network topology associated with the provider network, wherein the representation of the network topology indicates different networking configurations of the provider network that correspond to different time periods;

providing the one or more categorized usage records from the traffic classification node to a billing node of the provider network;

determining, using the one or more categorized usage records, a billing amount to be charged for the one or more network transmissions at the billing node; and transmitting the billing amount to a client device.

10. The method as recited in claim 9, wherein the first metering component comprises a kernel-mode component of a management software stack at the host, and wherein the second metering component comprises a user-mode component of the management software stack.

11. The method as recited in claim 9, wherein the one or more network transmissions comprise a set of network packets for which one endpoint comprises the virtualized resource instantiated at the host, wherein a second endpoint of the set has a particular Internet Protocol (IP) address, wherein the address endpoint information comprises the particular IP address, wherein the traffic metric comprises a number of bytes transmitted in the set of network packets, and wherein the networking metadata includes identification information of the virtualized resource distinguishing the virtualized resource from a different virtualized resource instantiated on the host.

12. The method as recited in claim 9, wherein the aggregation policy comprises one or more of (a) a chunk size determination policy usable to determine an amount of aggregated networking metadata to be transmitted to the classification node, (b) a chunk scheduling policy usable to determine a schedule in accordance with which the aggregated networking metadata is to be transmitted to the classification node, (c) a classification node selection policy, (d) a compression policy for transmission of the aggregated networking metadata, (e) a grouping policy usable to combine networking metadata for a set of IP addresses prior to transmitting the aggregated networking metadata, or (f) a sampling policy usable to select a subset of the aggregated networking metadata to be transmitted to the classification node.

13. The method as recited in claim 9, further comprising:

collecting, at one or more topology observer nodes of the provider network, networking configuration information associated with at least a portion of the provider network; and transmitting the networking configuration information and an associated timestamp to a topology authority node configured to generate the representation of the network topology based at least in part on the networking configuration information and the associated timestamp.

14. The method as recited in claim 9, wherein the one or more categorized usage records include a particular usage record indicating a billable usage category of the one or more network transmissions, wherein the billable usage category comprises at least one of: (a) a local-provider-network category, (b) an inter-region-provider-network category, (c) an extra-provider-network category, (d) a category associated with a particular multi-tenant service implemented at the provider network, (e) a category associated with a private network established within the provider network on behalf of a client, or (f) a category associated with a direct physical network link established at an edge node of the provider network to connect a client network with the provider network.

15. The method as recited in claim 9, further comprising:
   determining whether networking metadata records are to be collected corresponding to each network transmission during a particular time period, based at least in part on a count of a number of distinct endpoint addresses associated with network transmissions detected during another time period; and
   in response to a determination that networking metadata records corresponding to each network transmission are not to be collected, utilizing a sampling methodology to generate one or more networking metadata records during the particular time period.

16. The method as recited in claim 9, wherein the representation of the network topology is time-indexed and is based at least in part on network configuration information, and wherein the network configuration information comprises one or more timestamps associated with a routing change.

* * * * *